(12) United States Patent
Dai

(10) Patent No.: US 7,193,198 B2
(45) Date of Patent: Mar. 20, 2007

(54) IMAGE SENSOR AND PIXEL THAT HAS VARIABLE CAPACITANCE OUTPUT OR FLOATING NODE

(75) Inventor: Tiejun Dai, Sunnyvale, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 221 days.

(21) Appl. No.: 10/956,982

(22) Filed: Oct. 1, 2004

(65) Prior Publication Data

US 2006/0071147 A1  Apr. 6, 2006

(51) Int. Cl.
*H01L 27/00* (2006.01)
(52) U.S. Cl. .................... 250/208.1; 348/308
(58) Field of Classification Search ........ 348/302–304, 348/274, 275, 281; 257/233, 239; 250/208.1
See application file for complete search history.

(56) References Cited

U.S. PATENT DOCUMENTS 6,246,436 B1    6/2001   Lin 6,307,195 B1 * 10/2001  Guidash ............... 250/208.1

FOREIGN PATENT DOCUMENTS

EP   1 265 290         11/2002
WO   WO-02-063691      8/2002

OTHER PUBLICATIONS

European Search Report for European Application No. EP 0 525 5670 completed on Mar. 2, 2006, 3 pages.

* cited by examiner

*Primary Examiner*—Thanh X. Luu
*Assistant Examiner*—Tony Ko
(74) *Attorney, Agent, or Firm*—Perkins Coie LLP

(57) ABSTRACT

A pixel and image sensor formed in accordance with the present invention has two modes of operation: a 3T mode and a 4T mode. The present invention switches from a 3T to a 4T mode based upon the amount of illumination on the image sensor. The amount of illumination on the image sensor can be determined in a variety of ways. Once the level of illumination is determined, a decision is made by comparing the level of illumination to a threshold whether to operate in 3T mode (for high illumination) or 4T (for low illumination) mode.

14 Claims, 3 Drawing Sheets

IMAGE SENSOR AND PIXEL THAT HAS VARIABLE CAPACITANCE OUTPUT OR FLOATING NODE

TECHNICAL FIELD

The present invention relates to image sensors, and more particularly, to an image sensor that uses pixels that can vary their capacitance based upon the intensity of incident light.

BACKGROUND

Image sensors have become ubiquitous. They are widely used in digital still cameras, cellular phones, security cameras, medical, automobiles, and other applications. The technology used to manufacture image sensors, and in particular CMOS image sensors, has continued to advance at great pace. For example, the demands of higher resolution and lower power consumption have encouraged the further miniaturization and integration of the image sensor.

As the pixels become smaller, it becomes more difficult for the pixel to output a signal of adequate strength that can be easily deciphered by downstream signal processing. Moreover, there are demands on the image sensor to perform over a large range of lighting conditions, varying from low light conditions to bright outside sunlight. This is generally referred to as having a large dynamic range. Still, because of the decreasing size of the pixel, as described below, the dynamic range of the pixel may be limited.

DETAILED DESCRIPTION

In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well known structures, materials, or operations are not shown or described in order to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
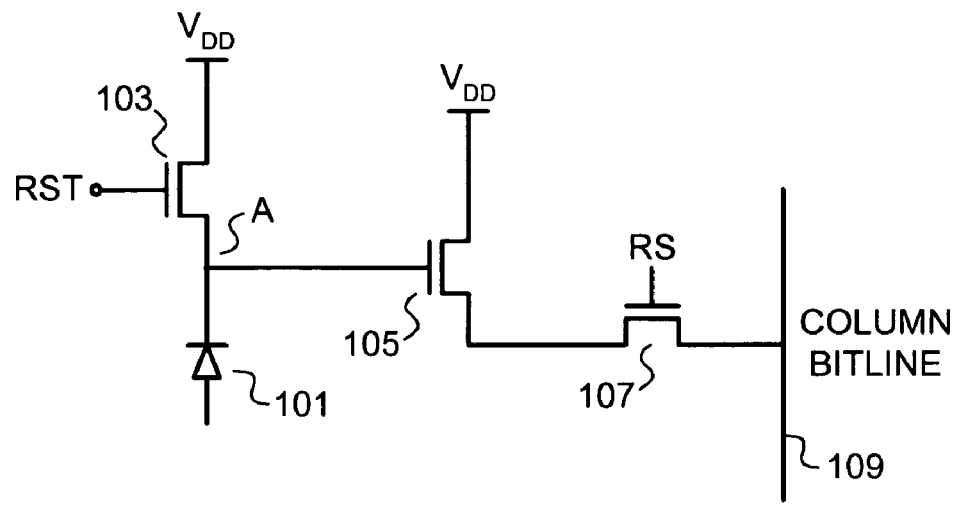
FIG. 1 is a schematic drawing of a three transistor (3T) active pixel used in a CMOS image sensor.

FIG. 1 illustrates a CMOS active pixel that uses three transistors. This is known in the art as a 3T active pixel. A light sensing element 101 outputs a signal that is used to modulate an amplification transistor 105. The signal is "placed" at node A which is connected to the gate of the amplification transistor 105. Thus, the amplification transistor 105 is in source-follower configuration. The light-sensing element 101 can be one of a variety of devices, including without limitation, photogates, photodiodes, pinned photodiodes, partially pinned photodiodes, etc.

During an integration period (also referred to as an exposure period), the light-sensing element 101 captures light that is incident onto the pixel and outputs a signal indicative of the amount of light incident on that light-sensing element 101. The signal (which is an accumulation of charge generated by the light sensing element 101) is stored on node A which is connected to the gate of the amplification transistor 105. The signal stored on node A is then used to modulate the amplification transistor 105. After the integration period, a reset transistor 103 is used to reset the level of the node A to a reference level prior to the start of the next integration period. Finally, a row select transistor 107 is used as a means to address the pixel and to selectively read out the signal onto a column bit line 109.

Figure 2:
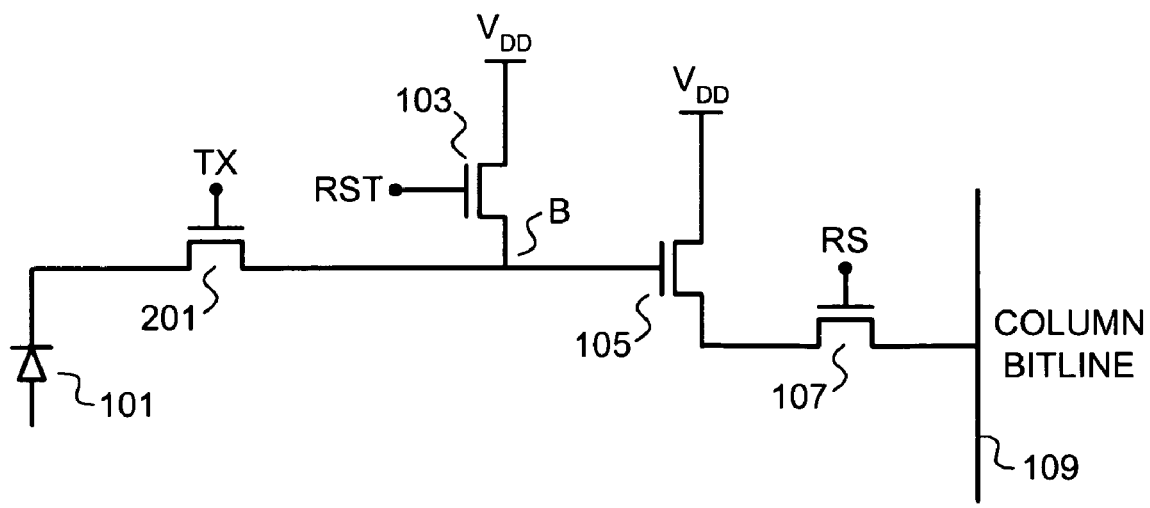
FIG. 2 is a schematic diagram of a four transistor (4T) active pixel formed in accordance with the present invention.

FIG. 2 is similar in many respects to the 3T active pixel of FIG. 1, except that an additional transfer transistor 201 is used to transfer the signal output by the light-sensing element 101 to a floating node B. This design is known as a four transistor or 4T pixel. In operation, during the integration period, the light sensing element 101 generates charge which is held at the light sensing element because transfer transistor 201 is off. After the integration period, the transfer transistor 201 is turned on to transfer the signal to the floating node B. After the signal has been transferred to floating node B, the transfer transistor 201 is turned off again for the start of a subsequent integration period. Thus, as seen, the transfer transistor 201 turns on and off periodically to transfer signal from each integration period to the floating node B.

The signal on the floating node B is then used to modulate the amplification transistor 105. Further, after readout through the column bitline 109, the reset transistor 103 resets the floating node B to a reference voltage, in this particular embodiment, $V_{dd}$.

In general, in the 4T pixel design, the floating node B is designed to be relatively small (when compared to floating node A of the 3T pixel design). A floating node B is designed to be relatively small in order to achieve high transfer gain. However, in high illumination conditions, the amount of charge (signal) produced by the light-sensing element 101 may be greater than the capacity of the floating node B. This will result in saturation of the floating node B and reduced dynamic range, as well as reduced signal-to-noise ratio (SNR).

The present invention allows the floating node B in a 4T active pixel to have a variable capacitance. Under high illumination light conditions, the transfer transistor 201 is turned on during the readout operation. This, in effect, increases the capacitance of the floating node B and the 4T pixel operates as a 3T pixel. However, in low-light conditions, the floating node B maintains its relatively small capacitance and the 4T pixel operates in accordance with normal principles of 4T pixel operation. The structure of an active pixel formed in accordance with the present invention is substantially the same as that shown in FIG. 2. However, as further detailed below, the operation of the image sensor and the active pixels within the image sensor is controlled such that the pixels behave as either a 3T pixel (under elevated illumination conditions), or a conventional 4T pixel (under lower illumination conditions).

Figure 3:
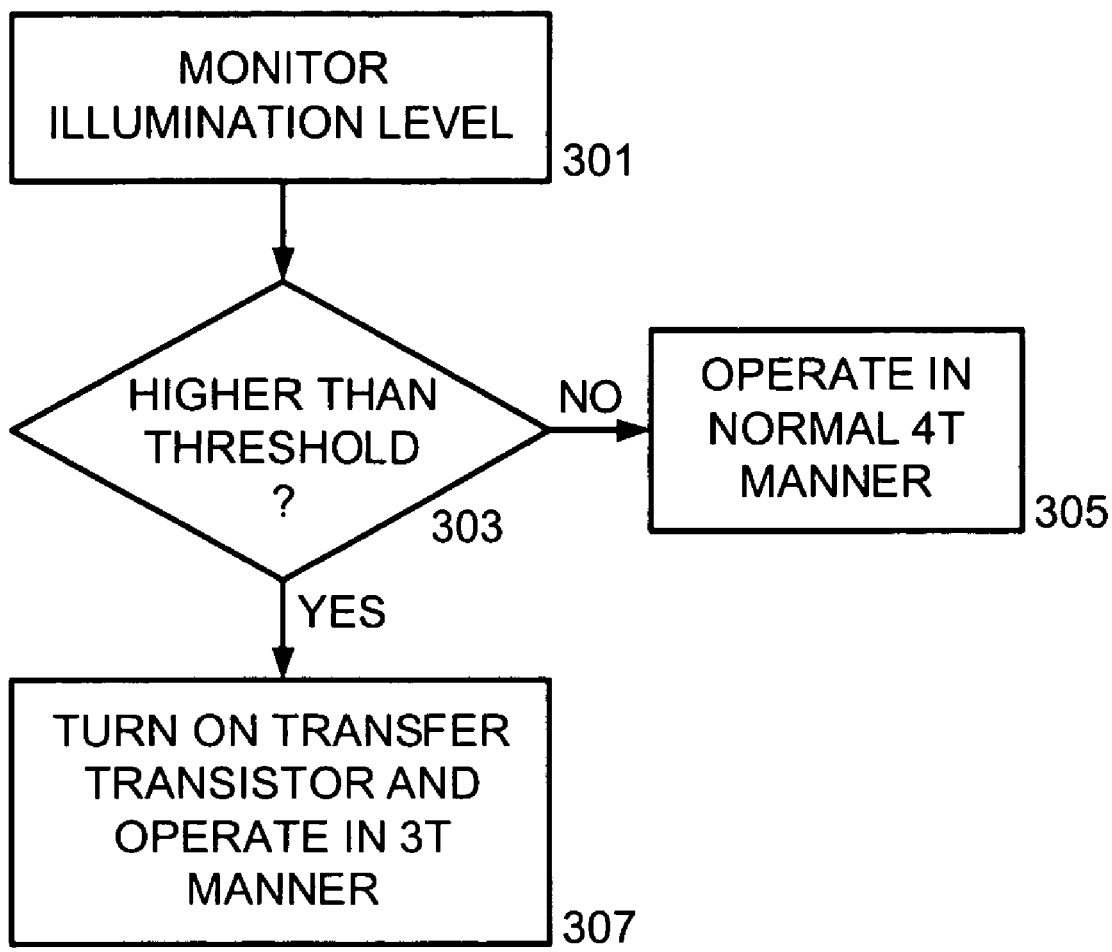
FIG. 3 is a flow diagram illustrating the method of operation of the 4T active pixel of FIG. 2.

Turning to FIG. 3, a flow diagram showing a method of the present invention is provided. First, at box 301, the illumination level incident to the image sensor (and thus pixels) is monitored. This can be done in any number of conventional ways. For example, the output from the image sensor can be examined for its brightness level. As can be appreciated of ordinary skill in the art, nearly every image sensor has circuitry for automatic gain control and exposure control. By determining the strength of the signal output from the pixels, the ambient light level can be determined. Alternatively, the processed output from the image sensor can be examined to determine the relative ambient lighting conditions. Still alternatively, a dedicated light-sensitive device outside of the imaging area of the image sensor can be used to monitor the amount of incident light onto the image sensor.

Next, at box 303, the illumination level determined at box 301 is compared to a threshold value. The threshold value is the trigger for transition between 3T operation and 4T operation. The precise point where the threshold is set may be made variable depending upon design considerations, parameters, and characteristics of the image sensor, and may even be adjustable at the discretion of the user of the image sensor. In any event, a threshold is used to delineate between 3T and 4T operation. If the illumination level determined at box 301 is higher than the threshold, then at box 307, the transfer transistor is turned on during operation and the pixel behaves as a 3T pixel. However, if the illumination level is lower than the threshold, then at box 305, the pixels operate in normal 4T operation.

As noted above, in a 4T pixel, in order to obtain high transfer gain, the floating node B is designed to be relatively small and have a relatively small capacitance, for example, on the order of 2 femtofarads. If the image sensor and pixels use a one-volt signal range, this means that the maximum number of electrons ($Q_{max}$) that can be held at the floating node B is about 12,500. Considering "shot noise," this results in a maximum signal-to-noise ratio of 112. However, in many illumination conditions, a light-sensing element, such as a pinned photodiode, may generate more signal (electrons) than $Q_{max}$.

In order to address this issue, in accordance with the present invention, the transfer gate 201 is kept in the on position during operation where there is relatively high ambient illumination. This results in the capacitance on the floating node B to increase substantially, i.e., the sum of the "4T normal" floating node (2 femtofarads), the capacitance within the transfer transistor 201, and the capacitance within the light sensing element 101. In one example, the transfer transistor being turned on and operating in capacitor mode may have a capacitance of 14 femtofarads. The light-sensing element, in the case of a pinned photodiode, may have a capacitance on the order of 4 femtofarads. This provides a total capacitance of 20 femtofarads.

When the same one-volt signal range is used, the maximum number of electrons capable of being stored is thus increased to 125,000, ten times that of normal 4T operation. Once again, considering shot noise, the maximum SNR is then approximately 354, more than three times 4T operation.

Thus, as seen from the description above, a pixel and image sensor formed in accordance with the present invention has two modes of operation: a 3T mode and a 4T mode. The present invention switches from a 3T to a 4T mode based upon the amount of illumination on the image sensor. The amount of illumination on the image sensor can be determined in a variety of ways, and any method for determining the level of illumination could easily be applied to the present invention. Once the level of illumination is determined, a decision is made by comparing the level of illumination to a threshold whether to operate in 3T (for high illumination) mode or 4T (for low illumination) mode.

Figure 4:
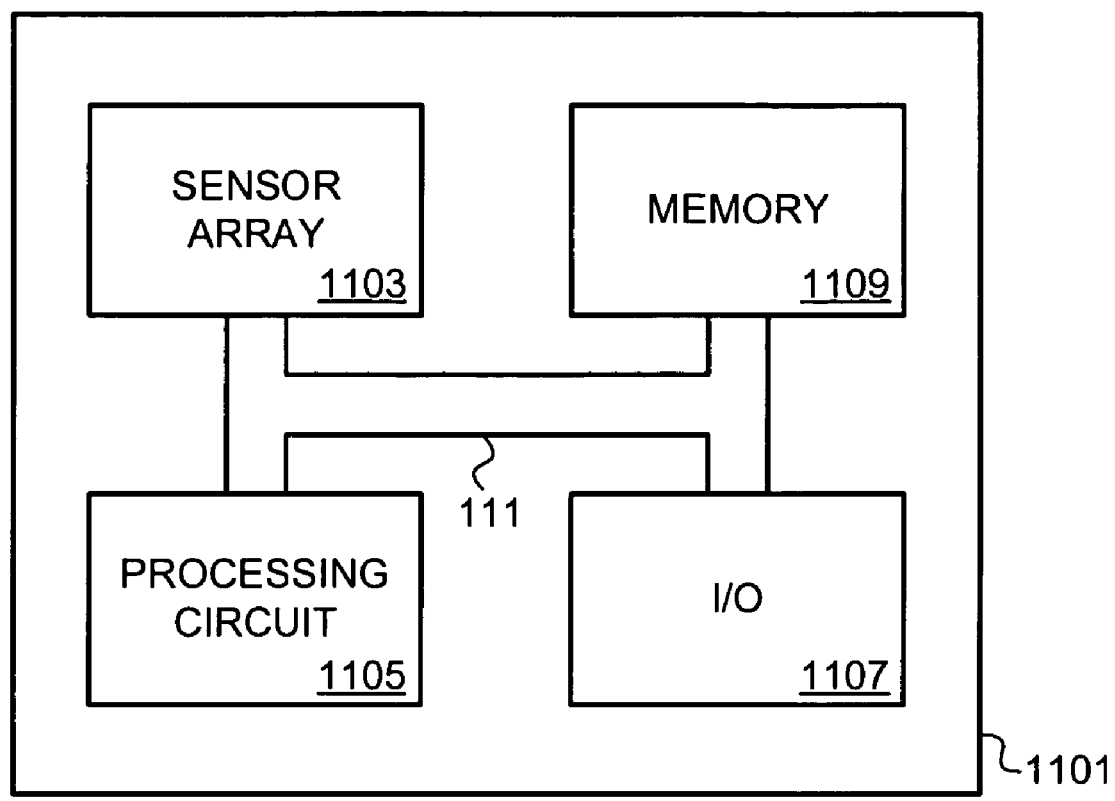
FIG. 4 shows an image sensor formed using the active pixels and methods of the present invention.

The active pixels described above may be used in a sensor array of a CMOS image sensor 1101. Specifically, FIG. 4 shows a CMOS image sensor formed in accordance with the present invention. The CMOS image sensor includes a sensor array 1103, a processor circuit 1105, an input/output (I/O) 1107, memory 1109, and bus 1111. Preferably, each of these components is formed on a single silicon substrate and manufactured to be integrated onto a single chip using standard CMOS processes.

The sensor array 1103 portion may be, for example, substantially similar to the sensor arrays portions of image sensors manufactured by the assignee of the present invention, OmniVision Technologies, Inc., of Sunnyvale, Calif., as model numbers OV5610 or OV7640, except that the pixels are replaced with the active pixels disclosed herein.

The description of the invention in this application as set forth herein is illustrative and is not intended to limit the scope of the invention. Variations and modifications of the embodiments described herein are possible, and practical alternatives to, or equivalents of the various elements, the embodiments are known to those of ordinary skill in the art. These and other variations and modifications of the embodiments disclosed herein may be made without departing from the scope and spirit of the invention.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. An active pixel comprising:
   a light sensing element formed in a semiconductor substrate;
   a transfer transistor formed between said light sensing element and a floating node and selectively operative to transfer a signal from said light sensing element to said floating node, wherein said transfer transistor is held in the on position during an integration period when a level of illumination is above a threshold, and is adapted to operate periodically to transfer said signal to said floating node after said integration period when the level of illumination is below the threshold; and
   an amplification transistor controlled by said floating node.

2. The pixel of claim 1 wherein said light sensing element is selected from the group of photodiode, pinned photodiode, partially pinned photodiode, or photogate.

3. The pixel of claim 1 wherein if said level of illumination is below said threshold, said transfer transistor turned off after said transfer is complete.

4. The pixel of claim 1 wherein said amplification transistor outputs an amplified version of said signal to a column bitline.

5. The pixel of claim 1 further including a reset transistor operative to reset said floating node to a reference voltage.

6. A CMOS image sensor comprising:
   a plurality of active pixels arranged in rows and columns, at least one of said active pixels is an active pixel according to claim 1.

7. The image sensor of claim 6 wherein said light sensing element is selected from the group of photodiode, pinned photodiode, partially pinned photodiode, or photogate.

8. The image sensor of claim 6 wherein if said level of illumination is below said threshold, said transfer transistor is turned off after said transfer is complete.

9. The image sensor of claim 6 wherein said amplification transistor outputs an amplified version of said signal to a column bitline.

10. The image sensor of claim 6 further including a reset transistor operative to reset said floating node to a reference voltage.

11. An active pixel comprising:
   a light sensing element formed in a semiconductor substrate;
   a floating node spaced apart from said light sensing element in said semiconductor substrate;
   a transfer transistor formed between said light sensing element and said floating node and selectively operative to transfer a signal from said light sensing element to said floating node, wherein
      if a level of illumination is above a preset threshold, said transfer transistor is turned on during an integration period; and
      if the level of illumination is below the preset threshold, said transfer transistor is turned off during said integration period and turned on after said integration period to transfer said signal from said light sensing element to said floating node.

12. The pixel of claim 11 wherein said light sensing element is selected from the group consisting of photodiode, pinned photodiode, partially pinned photodiode, or photogate.

13. The pixel of claim 11, further comprising an amplification transistor electrically coupled to the floating node and a column bitline.

14. A CMOS image sensor comprising an active pixel according to claim 11 and a processing circuit for receiving an output of said active pixels.

* * * * *